United States Patent [19]
Hark

[11] Patent Number: 4,808,287
[45] Date of Patent: Feb. 28, 1989

[54] WATER PURIFICATION PROCESS

[76] Inventor: Ernst F. Hark, Rte. 7, Box 513, Conroe, Tex. 97384

[21] Appl. No.: 136,406

[22] Filed: Dec. 21, 1987

[51] Int. Cl.$^4$ .............................................. C02F 9/00
[52] U.S. Cl. .............................. 204/182.5; 210/637; 210/638; 210/641; 210/669; 210/694; 210/137; 210/257.2; 210/259; 210/266; 210/900
[58] Field of Search ............... 210/638, 641, 652, 668, 210/669, 694, 137, 266, 900, 637, 257.2, 259; 204/182.5

[56] References Cited

U.S. PATENT DOCUMENTS

| | | | |
|---|---|---|---|
| 3,774,763 | 11/1973 | Yall et al. | 210/96 |
| 3,836,458 | 9/1974 | Wallis et al. | 210/259 |
| 3,870,033 | 3/1975 | Faylor et al. | 210/900 |
| 4,160,727 | 7/1979 | Harris | 210/900 |
| 4,161,445 | 7/1979 | Coillet | 210/181 |
| 4,196,081 | 4/1980 | Pavia | 210/284 |
| 4,548,716 | 10/1985 | Boeve | 210/900 |
| 4,676,908 | 6/1987 | Ciepiela et al. | 210/638 |

OTHER PUBLICATIONS

Kalbfuss, "Design of Modern High Purity Water Systems"; vol. 4 Ultrapure Water 18–30 (1987).

*Primary Examiner*—Ivars Cintins
*Attorney, Agent, or Firm*—Arnold, White & Durkee

[57] ABSTRACT

Potable water from a municipal water supply is treated to remove suspended solids, organic and inorganic dissolved solids, dissolved carbon dioxide gas and metal contaminants so as to produce ultra-pure water in the 16 megohm-cm$^3$ and greater range. The process involves prefilteration of the water; activated carbon filtration; secondary guard filtration; double reverse osmosis treatment of the water. The process further involves the use of either an anion exchange or electrodialysis unit to remove further impurities from the water. A method for recycling part of the discharged water is also provided.

9 Claims, 1 Drawing Sheet

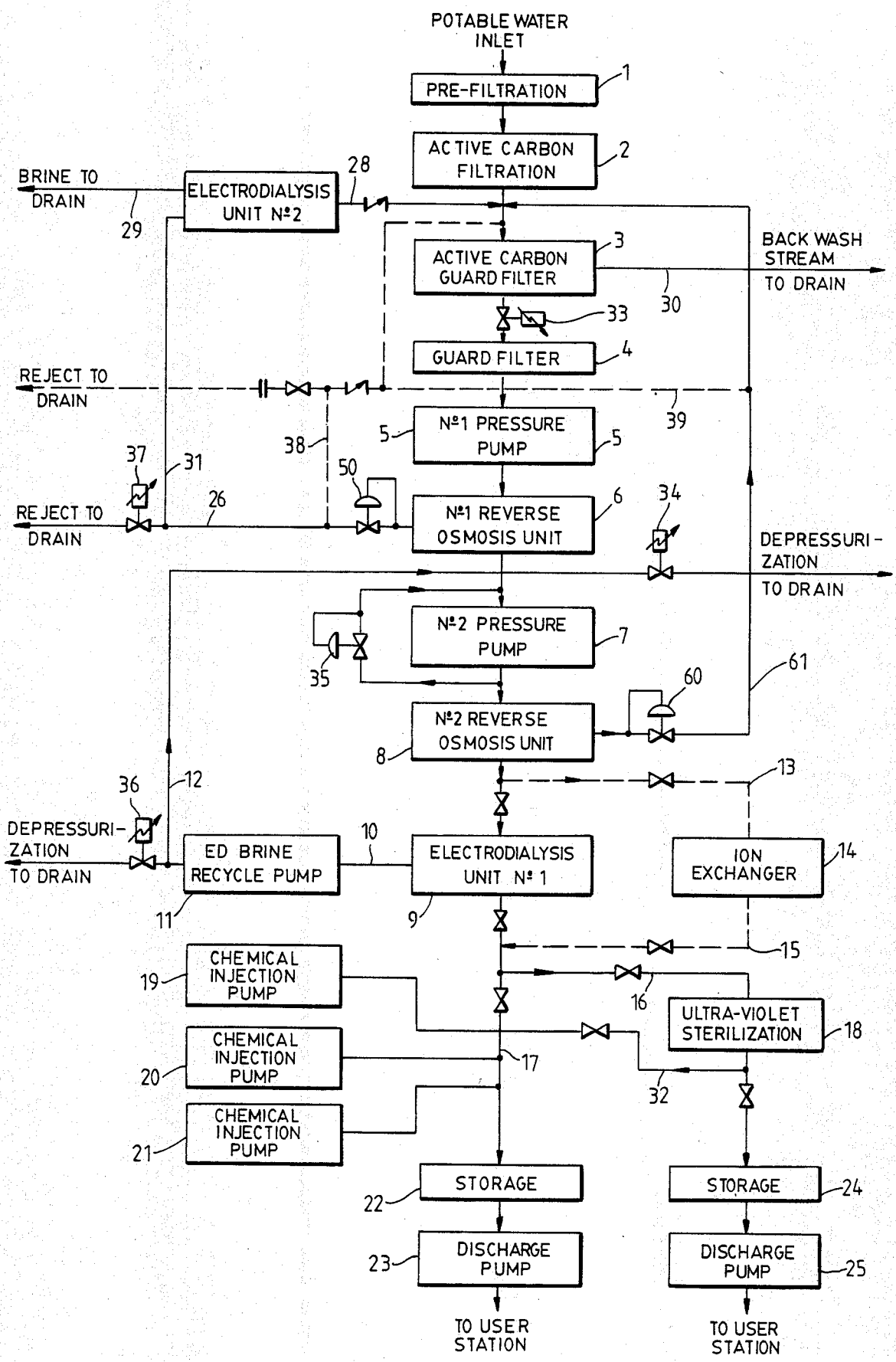

WATER PURIFICATION PROCESS

BACKGROUND OF THE INVENTION

The invention relates to the treatment of water, and the automatic injection of chemicals and additives to the purified water, and the printing, food processing, and plating industries, and the mixing of saline solutions with purified and sterilized water for medical purposes such as kidney dialysis.

The printing industry uses semi-purified water mixed with chemicals in the printing process. In addition to the chemicals, alcohol is added to the mixture to produce the desired print quality. Through the use of ultra-pure water in conjunction with chemicals, the use of alcohol could be reduced or eliminated. Ultra-pure water improves the printing quality, and reduces the amount of ink used in the printing process.

Similarly, ultra-pure water is needed and used in connection with the plating or layering of materials used in the production of semi-conductor technology and ultra-pure water is also used in medical applications, for example, kidney dialysis. Previous attempts to produce ultra-pure water have resulted in waters that have a purity of five to ten megohm-cm$^3$. While this have proven to be acceptable for most applications, it is desirable to develop ultra-pure water and methods for producing ultra-pure water, having a purity of greater than ten megohm-cm$^3$.

A water purification process producing five to ten megohm-cm$^3$ quality water and with chemical injection system has been fabricated using individual commercially available water purification units. The longevity of inline service of some of the critical parts was previously limited, requiring replacement at high cost. Thus, it was desirable to design a unit with a long service life. The deionizer or ion exchange portion of the purification system was one area requiring changes and a first improvement was made in upgrading the efficiency of the deionizing vessel in improving the separation and stack ability of the vessel sections to accommodate the use of different resins in various separate combinations within one vessel, and without danger of mixing different types of resin materials during process contaminations.

SUMMARY OF THE INVENTION

The longevity or service life of the resin is subject to the amount of impurities contained in the incoming process. Purifying the water upstream of the ion exchanger thus became of importance. An inline dual reverse osmosis system has been designed to improve the quality of the anion exchange feed water. In this system, the first reverse osmosis membrane removes 96% of the impurities contained in the incoming water stream. The outlet stream of the first reverse osmosis membrane is then directed to the inlet of the second reverse osmosis membrane, which removes 96% of the impurities of the 4% remaining in the outlet stream of the first reverse osmosis membrane. In essence, the water stream between the inlet of the first reverse osmosis membrane, and the outlet of the second reverse osmosis membrane is reduced in impurities by a factor of approximately 700. Water purification unit with an inline dual reverse osmosis system and improved deionizing cartridge assembly has been fabricated, and is currently in operation. The water quality from this unit has been found to have a purity of greater than 16 megohm-cm$^3$.

The advantages of the unit are several. First, the ion and anion exchange resins used in the final treatment of the water have an extended life from that found in conventional units by the removal of contaminants by the reverse osmosis membranes upstream from the unit. Additionally, where electrodialysis is used in the lieu of an anion exchanger, the power requirements for the electrolyser unit are greatly reduced because of the high resistance to electrical conductance of the very clean inline water.

The ultra-pure water leaving the electrodialysis or ion exchange can be further treated by either chemical injection to produce water for printing purposes, or can be subjected to ultra-violet sterilization for the purposes of producing uncontaminated water for use in medical or food processing purposes.

DESCRIPTION OF THE DRAWINGS

FIG. 1 is a schematic drawing of the purification process of the instant invention.

DESCRIPTION OF THE PREFERRED EMBODIMENT

Referring to FIG. 1, there is illustrated therein a flow sheet of the water purification system in accordance with the preferred embodiment of the invention. It will be appreciated that the detailed description of the invention which follows is directed to the specific embodiment illustrated in the drawing, but that the broad scope of the invention is not limited thereto.

A typical municipal water supply stream to be treated in accordance with the invention and which contains the usual form of nontoxic materials and additives, in the form of dissolved minerals, dissolved organic materials, suspended solids, dissolved carbon dioxide gas, dissolved chlorine, hypochloride, sodium fluoride, sulfur, iron and other dissolved materials found in the average municipal potable water suply. In the first step of the process, the municipal water stream enters a pre-filteration chamber 1 for the removal of suspended solids down to approximately five micron size from the feed water stream. The filters to be used can be of a cellulose fiber wound material, which can be placed into a sump assembly. The size of the filter elements are relative to the water to be filtered, and the number of filters should be such as to permit switch filters during operations.

As the water leaves the pre-filteration chamber it next enters an activated carbon adsorption unit. The unit can be of any type commonly used for water purification. As the water passes through the activated carbon, the organic materials, chlorine and hypochloride are absorbed from the water.

The activated carbon can continue to be used, and can be backwashed to permit recycling of the treatment bed. The backwash water is discharged through a line 30 to a drain.

As the water leaves the activated carbon filtration chamber and next encounters an activated carbon guard filter 3. This filter is similar to the activated carbon absorption unit 2 with the exception that the cartridges of the guard filter can be replaced as needed. The purpose of the guard filter 3 is to absorb contaminants which might accidentally pass through the activated carbon absorption unit during the backwash cycle.

The filtered water next encounters a second guard filter 4 with a filter size of 1 to 5 micron. This filter is designed to trap any activated carbon particles which may break free from the carbon beds 1 and 3 to prevent contamination of the reverse osmosis membranes downstream. The water leaving the guard filter 4 then enters the first reverse osmosis pressure pump 5, where the water is pressurized up to the maximum feed water pressure for the first reverse osmosis unit 6.

The pump's output capacity must not exceed the maximum feed water requirements for the membrane and is preferred that the pressure continually be equal to the maximum feed water requirements for the membrane. To assure accurate pump discharge and pressure conditions, it is necessary to control the pump's discharge pressure and flow through back pressure and flow recirculating controls. In the preferred embodiment, the pressure pump 5 is capable of raising the pressure in the first osmosis unit 6 to between thirty and four hundred pounds per square inch. The preferred reverse osmosis unit is the Filmtec ™ Tap Water Reverse Osmosis Element with a maximum operating pressure of 300 psi.

Pressurized water from the first reversed osmosis pumps enters the first reversed osmosis unit 6, and impurities are removed by the action of the reverse osmosis membrane in the unit. The first reverse osmosis membrane unit 6 acts to remove up to approximately 95 percent of the contaminants in the water entering the device depending upon the unit used.

The permeated product water of the reverse osmosis membrane 6 leaves the unit for re-pressurization into the second pressure pump 7 for further processing. The membrane reject stream leaves the membrane through a line 26 flow to a drain. To maintain proper osmotic pressure, which is relative to the discharge pressure and flow pressure of the first pump 5, back pump pressure regulators 50 are used to maintain proper osmotic pressure.

For cleaning the brine stream of contaminants, and for conservation of water, the reject brine stream can be diverted via line 31 to an electrodialysis unit 27 to remove contaminants. The electrodialysis unit 27 should be sized to lower the contaminant level of the reject brine down to a level equal or slightly lower than the level of the contaminated water of the municipal feed water supply. The "clean" discharge stream from the electrodialysis unit will re-enter the municipal water feed water stream through line 28 downstream of the activated carbon filter 2 to be recycled. The brine discharge stream flows to a drain via line 29. The recycling of the discharge from the first reverse osmosis unit conserves a significant amount of water.

In lieu of electrodialysis unit 27, approximately fifty to seventy percent of the brine stream flowing from the first reverse osmosis unit 6 can be recycled through ine 38 back into the feed water line upstream of the activated carbon guard filter 3. The impurities contained in said brine stream must be diluted to a level equal to, or lower than, the impurities contained in the feed water make-up stream. To achieve said dilution, the "clean" brine stream from the second reverse osmosis unit 8 is mixed via line 39 with the brine stream of line 38. Thirty to fifty percent of the brine flowing from the first reverse osmosis unit 6 must be continuously drained off through restriction orifice 40.

Permeate feed water from the first reverse osmosis membrane 6 enters a second pressure pump 7, which pressurizes the processed water up to the maximum feed pressure before the second reverse osmosis unit 8. Again, the pump's output capacity must not exceed, but must be equal to the maximum water product output of the first reversed osmosis unit 6, as well as to meet the pressure and feed water flow requirements for the second reverse osmosis unit 8. The discharge side of the pump is equipped with a pressure regulator 35 to release an excess discharge flow back into the pump's suction line and to prevent the buildup of a vacuum in the pump's suction line, which in turn could create a vacuum in the first reverse osmosis membrane's permeate outflow side. Thus, preventing excess differential membrane pressure which could collapse or damage the membrane.

Pressurized product enters the second reversed osmosis unit 8. Through the action of the second reverse osmosis membrane in the second unit, still more impurities are removed. If each unit removes 96% of the impurities which reach the unit, a significant reduction of impurities can be achieved.

Permeated product water flows from this unit at near atmospheric pressure to the electrodialysis unit 9.

The brine with a concentration of impurities of approximately 96% of the impurities removed from the permeate, is recycled to conserve water within system.

The brine from the second reverse osmosis unit 8 is recirculated by a back pressure regulator 60 in line 15 in the feed water line upstream of the activated carbon filter 3. The impurities contained in the recirculated brine flow are approximately 4% of the impurities contained in the municipal feed water. This recycling again reduces the amount of water lost in the system, it also reduces the concentration of impurities reaching this first reverse osmosis unit 6 which increases the effectiveness of the unit.

The electrodialysis unit 9 is provided with platinum anode and cathode electrodes to allow the reversal of electric current for the purpose of cleaning off contaminant file and buildup from the plates. The spacing between the anode and cathode shall be such as to operate the unit within the minimum voltage (DC) requirements. To maintain accurate power requirements and to prevent overvoltage or hydrogen overvoltage the unit shall be equipped with a "Poggendorff" compensation method potentiometer to continuously monitor power requirements and reverse polarity upon overvoltage requirements for the purpose of cleaning (shacking off) contaminants, which have deposited on the electrodes.

The brine solution from the electrodialysis unit flows via line 10 to a pressure pump 11 and is recirculated through line 12 into the suction line of the second pressure pump 7. For standby and maintenance purposes of the electrodialysis unit, a resin type deionizer exchanger unit 14 is placed in parallel flow through lines 13 and 15 with the electrodialysis unit.

Following the electrodialysis or ion exchange treatment of the permeate water, the water can be further treated by flow through a line 16 to an ultra-violet sterilization unit 18, and then to storage 24 and to a send out pump, or the water can be sent through a line 17 where it is subjected to one or more chemical injection systems for addition of desired additives, and then to storage, and eventual send out pumping. Additionally, the water can be passed through the ultra-violet sterilization unit 18 and recycled to the main line 17 by a line 32 for chemical injection treatment of the water as desired.

Pressure Regulation Within Purification System

Pressure control of the in line dual osmosis units is critical to the instant invention. Excessive reverse osmosis membrane pressure, or vacuum conditions within the reverse osmosis units, can cause damage to the membranes, particularly the membranes of the first reverse osmosis unit. For example, upon automatic or manual shutdown of the unit the main feed water inlet solenoid valve 33 closes, the first pressure pump 5 stops, and the second pressure pump 7 also stops. At this point, the pressurized water within the system is blocked in between the first solenoid valve 33 and the outer boundary layers of the first reverse osmosis membrane. The pressurized water between the second pressure pump 7 and the outer boundary layers of the second reverse osmosis membrane depressurizes to the section side of the second pump. Since both reverse osmosis reject water outlet streams are pressure regulated by back pressure regulators, the feed water stream of both reverse osmosis units is essentially blocked in. This thencan cause damage to the membranes.

To correct this problem for the first reverse osmosis unit 6, a minimum flow orifice has been provided in the back pressure regulator valve 50. This minimum flow orifice has been designed to pass approximately 10 percent of the total flow out of the system, allowing for slow depressurization of the reject and feed water stream of the reverse osmosis unit 6, even though the back pressure regulator 50 has been closed off. The permeate discharge side of the first reverse osmosis unit 6 is protected against overall pressurization by a second solenoid valve 34. This valve is normally open and opens up upon electrical deenergization of the total power grid of the unit or on automatic shutdown of the unit by control systems.

Pressurized water from the feed water system of the second reversed osmosis unit 8 depressurizes via a pressure regulator 35 into the suction side of the second pressure pump 7 and flows to a drain via the second solenoid valve 34. The permeate outlet stream from the second reverse osmosis unit 8 depressurizes via the deionization filters into the product storage tanks. At this point, the unit is depressurized in a shut down condition. It is important, however, that all vessels and piping systems remain full of water and not be allowed to drain. To avoid draining, certain drain pipes are fitted with "gooseneck" type piping configurations to create artificial high points to maintain high water levels in these units. It will be obvious to those skilled in the art that other units may be possible to be used, however, this is believed to be the simplest method accomplishing this.

Upon manual or automatic restart of the water purification system, the following sequence occurs simultaneously. The first solenoid valve 33 opens, and the second solenoid valve 34 closes. The first and second pressure pumps 5 and 7 start up, with the first pump 5 receiving suction water from the solenoid valve 33, and followed by pressurization of the first reverse osmosis unit 6. The back pressure regulator 50 will be closed off until the regulator set pressure level has been reached. The first reverse osmosis unit's permeate water outlet flow will increase from zero to near full production.

The second reverse osmosis pressure pump 7 starts at about the same time as the first pump 5. During the first ten to fifteen seconds, the permeate water flow out of the first reverse osmosis unit 6 is insufficient in flow to supply the amount of water required before the suction feed of the second reverse osmosis pump 7. During this critical start up period, it is necessary to prevent a vacuum from forming on the permeate side of the first reverse osmosis unit 6. To accomplish this, a pressure regulator 35 opens to recirculate water from the discharge side to the suction side of the second pressure pump 7. The regulator 35 is set to maintain two to four PSIG pressure on the pump suction side. This accomplishes two goals. First, it provides protection of the first reverse osmosis unit against a vacuum condition, and second, provides sufficient NPSH (Net positive suction head) for the second pressure pump, and prevents pump cavitation.

Through the use of a pressure regulating device such as the pressure regulator 35, the sizing of the second pressure pump 7 for total flow output becomes less critical. It is, however, pertinent to size the pump's output capacity slightly in excess of the feed water requirements for the second reverse osmosis unit, and to recycle the excess output via the bypass regulator. With this type of control system, the first reverse osmosis unit 6 is protected against pump suction vacuum from the second pressure pump and the pump is protected against cavitation and dry running conditions during the start up period. The discharge pressure of the second reverse osmosis unit 8 is governed by the set point of the back pressure regulator 60. The back pressure regulator 60 is not retrofitted with a minimum orifice device since the rejected stream of the second reverse osmosis unit is recycled into the pressurized feed line upstream of the activated carbon filter. Instead, the pressurized feed water side of the second reverse osmosis membrane depressurizes on shutdown by a pressure regulator 35.

For the protection of the electrodialysis unit during shutdown condition, and to prevent water from depressurizing from the discharge side back to the suction side of the brine recycle pump, a final celloid valve 36 opens on shut down depressurizing the discharge side of pump 11 to drain. The piping configuration downstream of the valve 36 is such as to prevent the draining of water from the piping system. For complete depressurization of the first reverse osmosis membrane and electrodialysis unit, a fourth shutdown valve 37 opens up on power failure or automatic shutdown. The electrodialysis units deenergize on any shutdown.

The purification system can be constructed with any commercially available units. The reverse osmosis units should be of a design which affords a 94% or greater removal of impurities to achieve water purities described above. While the significant water purity can be achieved by using lesser units, the purity level will not be as high and the life of the electrodialysis unit or ion exchanger will be greatly reduced.

What is claimed is:

1. A method for purifying water comprising:
  prefiltering the water by passing it through a one to five micron filter;
  passing the water flowing from the prefiltration through an activated charcoal filter;
  passing the water from the activated charcoal filter through a second activated charcoal filter;
  passing the water from the second charcoal filter through a guard filter, the quard filter beinq one to five microns in size;

pressurizing the water from the guard filter to between 30 and 400 pounds per square inch by means of a first pressure pump:

subjecting the water leaving the first pressure pump to a first reverse osmosis treatment to remove dissolved particles;

pressurizing the water leaving the reverse osmosis treatment to between 0 and 400 pounds per square inch by means of a second pressure pump;

subjecting the pressurized water from the second pressure pump to a second reverse osmosis treatment; and recycling the brine from the second reverse osmosis treatment to a ooint before the first reverse osmosis treatment.

2. The method of claim 1 further comprising the steps of subjecting the purified water from the second reverse osmosis treatment to electrodialysis to remove additional impurities and recvclino the brine from said electrodialvsis treatment to a ooint before the second osmosis treatment.

3. The method of claim 2 further comprising the steps of sterilizing the water using ultraviolet sterilization.

4. The method of treating water of claim 1, further comprising the step of treating the brine from the first reverse osmosis treatment to electrodialysis to remove impurities and returning the treated water from the electrodialysis treatment to the flow of the water teeatment system at a point before the first reverse osmosis treatment.

5. An apparatus for the treatment of water comprising:

a prefiltration system to remove sediments from the water;

a first activated charcoal filter which removes dissolved organic impurities from the water leaving the prefiltration system;

an activated charcoal guard filter through which the water from the first activated charcoal filter passes, the guard filter being designed to prevent water backwashed from the first activated charcoal filter from entering the filtration system;

a second guard filter which removes any activated charcoal particles from the water leaving the activated charcoal guard filter;

a first pressure pump which pressurizes the water from the second guard filter;

a first reverse osmosis unit which receives pressurized water from the first pressure pump and removes impurities from said water;

a second pressure pump which pressurizes the purified water, from the first reverse osmosis unit;

a second reverse osmosis unit which receives the purified water from the second pressure pump and removes additional impurities from the purified water; and a brine recycle unit which recycles the brine from the second reverse osmosis unit to a point before the first reverse osmosis unit.

6. The apparatus of claim 5 further comprising a pressure regulation system which controls the pressure in said reverse osmosis units to prevent damage to the reverse osmosis units.

7. The apparatus of claim 5 further comprising a second brine recycling unit which recycles brine from the first reverse osmosis unit to a point just before the first reverse osmosis unit.

8. The apparatus of claim 7 further comprising an electrodialysis unit which cooperates with the second brine recycling unit to remove impurities from the recycled brine prior to the brine being reintroduced into the purification system.

9. The apparatus of claim 5 further comprising an electrodialysis unit which receives the treated water from the second reverse osmosis unit and removes additional impurities from the treated water and an electrodialysis recycling unit which recycles the brine from the electrodialysis unit to a point before the second reverse osmosis unit.

* * * * *

UNITED STATES PATENT AND TRADEMARK OFFICE
CERTIFICATE OF CORRECTION

PATENT NO. : 4,808,287

DATED : Feb. 28, 1989

INVENTOR(S) : Ernst F. Hark

It is certified that error appears in the above-identified patent and that said Letters Patent is hereby corrected as shown below:

Column 2, line 40, change "suply" to --supply--.

Column 3, line 56, change "ine" to --line--.

Column 6, line 67 (line 9 of Claim 1), change "quard" to --guard-- and change "beinq" to --being--.

Column 7, line13 (line 23 of Claim 1), after "recycling" delete --the--; line 14 (line 24 of Claim 1), change "ooint" to --point--.

Column 7, line 19 (line 4 of Claim 2), change "recvclino" to --recycling--.
Column 7, line 20 (line 5 of claim 2) change "trodialvsis" to --trodialysis--; line 20 (line 5 of Claim 2), change "ooint" to --point--; line 20 (line 5 of Claim 2), after "second" insert --reverse--.

Column 7, line 25 (line 2 of Claim 4), after "treating" delete --the--; line 28 (line 5 of Claim 4), change "teeat-" to -- treat- --.

UNITED STATES PATENT AND TRADEMARK OFFICE
CERTIFICATE OF CORRECTION

PATENT NO. : 4,808,287

DATED : Feb. 28, 1989

INVENTOR(S) : Ernst F. Hark

It is certified that error appears in the above-identified patent and that said Letters Patent is hereby corrected as shown below:

```
    Column 8, line 12 (line 22 of Claim 5), after "water"
delete --,-- (the comma); line 17 (line 27 of Claim 5), after
"recycles" delete --the--.
```

Signed and Sealed this

Twenty-second Day of August, 1989

Attest:

DONALD J. QUIGG

*Attesting Officer*     *Commissioner of Patents and Trademarks*